United States Patent
Fuchs

(10) Patent No.: US 9,242,216 B2
(45) Date of Patent: Jan. 26, 2016

(54) APPARATUS FOR MINIMIZING BYPASS IN AMMONIA OXIDATION BURNERS OF INDUSTRIAL PLANTS WITH BURNER DIAMETERS OF 2-7 M IN NATURAL- OR FORCED-CIRCULATION BOILERS

(75) Inventor: Juergen Fuchs, Dortmund (DE)

(73) Assignee: THYSSENKRUPP INDUSTRIAL SOLUTIONS AG, Essen (DE)

(*) Notice: Subject to any disclaimer, the term of this patent is extended or adjusted under 35 U.S.C. 154(b) by 4 days.

(21) Appl. No.: 14/343,696

(22) PCT Filed: Sep. 7, 2012

(86) PCT No.: PCT/EP2012/003763
§ 371 (c)(1),
(2), (4) Date: Jun. 3, 2014

(87) PCT Pub. No.: WO2013/034303
PCT Pub. Date: Mar. 14, 2013

(65) Prior Publication Data
US 2015/0209754 A1 Jul. 30, 2015

(30) Foreign Application Priority Data
Sep. 9, 2011 (DE) .......................... 10 2011 112 782

(51) Int. Cl.
*B01J 8/00* (2006.01)
*C01B 21/28* (2006.01)
*B01J 8/02* (2006.01)
*C01B 21/26* (2006.01)
*B01J 19/00* (2006.01)

(52) U.S. Cl.
CPC ............... *B01J 8/008* (2013.01); *B01J 8/0257* (2013.01); *B01J 19/0053* (2013.01); *C01B 21/267* (2013.01); *C01B 21/28* (2013.01);*B01J2208/00884* (2013.01); *B01J 2219/00018* (2013.01); *B01J 2219/00761* (2013.01)

(58) Field of Classification Search
CPC .......... B01J 8/008; B01J 8/025; B01J 8/0264; C01B 21/28; C01B 21/267
See application file for complete search history.

(56) References Cited

U.S. PATENT DOCUMENTS

| 2004/0234433 | A1 | 11/2004 | Axon et al. |
| 2006/0110302 | A1 | 5/2006 | Oien et al. |
| 2012/0034148 | A1 | 2/2012 | Schwefer et al. |

FOREIGN PATENT DOCUMENTS

| DE | 102008059930 | 6/2010 |
| WO | 0040329 | 7/2000 |
| WO | 03000400 | 1/2003 |

OTHER PUBLICATIONS

International Search Report for PCT/EP2012/003763, English translation attached to original, Both completed by the European Patent Office on Jan. 3, 2014, All together 5 Pages.

*Primary Examiner* — Lessanework Seifu
(74) *Attorney, Agent, or Firm* — Lathrop & Gage LLP

(57) ABSTRACT

Burner basket system for ammonia oxidation burners for industrial plants with burner diameters of 2-7 m in a natural- or forced-circulation boiler suitable for minimizing gas slip and for minimizing wave formation contents in the burner basket and loss of contents in the burner basket, wherein the burner basket has a wall anchored in the ammonia oxidation burner and the burner basket has a gas-permeable bottom plate, placed on internal fittings of the forced circulation boiler, wherein the wall and the gas-permeable bottom plate are not mechanically connected to each other, and the wall of the burner basket tapers conically towards the bottom plate at an angle of 5-20° from the perpendicular, and in all operating states of the ammonia oxidation burner there is a peripheral gap in the range from 5 to 10 mm between the wall and the gas-permeable bottom plate.

7 Claims, 1 Drawing Sheet

Fig. 1a - PRIOR ART
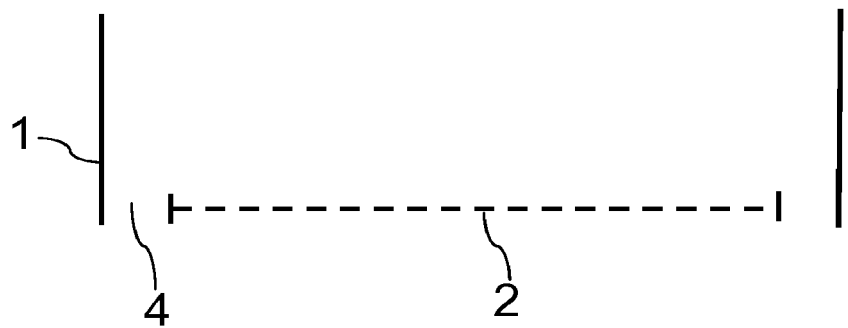
Fig. 1b
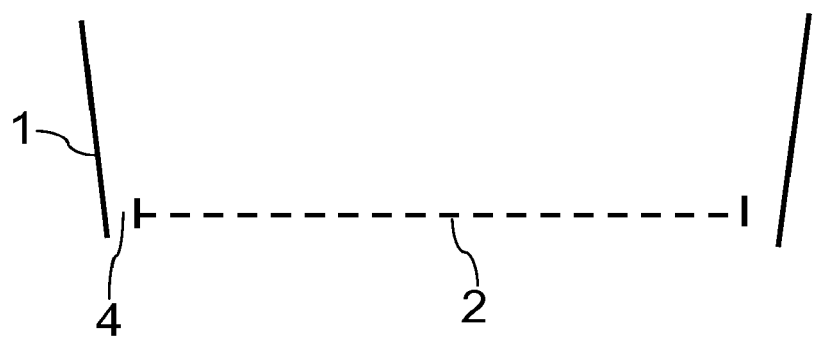
Fig. 1c
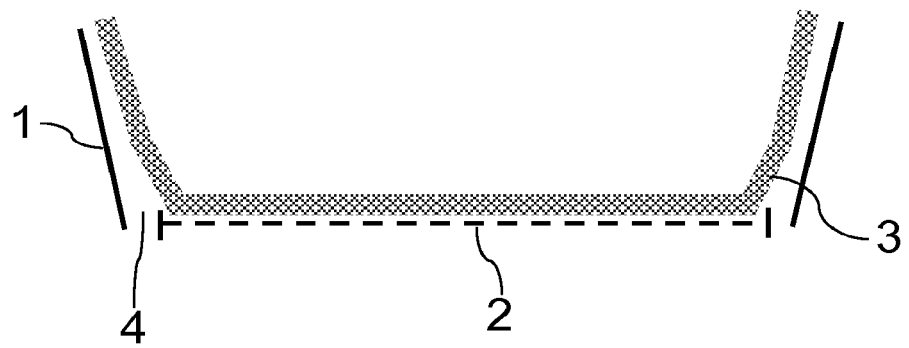

APPARATUS FOR MINIMIZING BYPASS IN AMMONIA OXIDATION BURNERS OF INDUSTRIAL PLANTS WITH BURNER DIAMETERS OF 2-7 M IN NATURAL- OR FORCED-CIRCULATION BOILERS

CROSS-REFERENCE TO RELATED APPLICATION

This application is the U.S. national phase of PCT Application No. PCT/EP2012/003763 filed on Sep. 07, 2012, which claims priority to German Patent Application No. 10 2011 112 782.1 filed on Sep. 9, 2011, the disclosures of which are incorporated in their entirety by reference herein.

The invention relates to a system of a burner basket in an ammonia oxidation burner, the system being suited to minimize gas slip and to minimize surface corrugation of media contained in the burner basket as well as to minimize loss of media contained in the burner basket and a method for minimising gas slip and for minimising surface corrugation of media contained in the burner basket as well as for minimising the loss of media contained in the burner basket. This means that the burner basket system according to the invention is to ensure sealing against slip-through of carrier material (packing material, catalyst material). A further aim is to minimize the familiar phenomenon of groove and ridge formation (surface corrugation) in the peripheral area of the carrier material as a result of start-up and shut-down operations, without the necessity of installing additional internal components in the packed bed.

Nitric acid is produced by reaction of $NO_2$ with water and oxygen (air), with $NO_2$ being obtained by oxidation of NO. The NO required is mostly produced by oxidation of $NH_3$ in an ammonia oxidation burner.

Used as catalysts are, for example, platinum/rhodium gauzes. These are used inside the burner, possibly in combination with catcher systems, and arranged on top of carrier materials contained in a burner basket. Mostly these carrier materials are Raschig or Pall rings, Berl, Interlox or Torus saddles and/or Interpack bodies of a size from approx. 5 to 200 mm. These are made of stoneware, porcelain, glass, catalyst materials or stainless steel and are provided on supporting grids, which may, for example, be designed as perforated plates, the free cross-section of which is at least equal to or larger than the relative void volume of the packing material. These supporting grids constitute a gas-permeable bottom plate of the burner basket. The supporting grids are mostly provided with further supporting fabrics for the carrier materials. To keep them in position, the catalyst gauzes are fixed, also mostly in combination with further supporting fabrics, in the burner basket by means of clamping devices.

The supporting grids are frequently arranged loosely on top of other internal components also provided inside the ammonia oxidation burner so that there is no mechanical connection between the outer wall of the burner basket and the supporting grids. Other internal components of such kind are mostly provided because—in practice—operation is frequently implemented with a combination of $NH_3$ combustion devices and natural circulation boilers or forced circulation boilers (La Mont waste heat boilers). This is of advantage as a decomposition of the NO formed is to be avoided and thus quick cooling of the gas mixture obtained to be achieved. For this purpose, tube coils for cooling the gas mixture are mostly provided below the burner basket in the ammonia oxidation burner, on top of which the supporting grids can be arranged in a flexible manner.

The reaction temperature during the conversion of ammonia with air to nitric oxide and water vapour reaches up to 950° C. and the process reaches pressure values of up to 10 bar. The result is that the burner basket expands accordingly. Such expansion occurs in places which are covered with carrier material, i.e. for example on the gas-permeable bottom plate, with a little time delay as the temperature rise takes place in a time-delayed manner. Designs of burner baskets which have been fabricated in one single piece, i.e. whose outer wall is connected mechanically to the gas-permeable bottom plate, are thus subject to extreme wear as the material of the burner baskets is exposed to high stress especially during start-up and shut-down procedures. This is the reason why efforts are being made to avoid design types of such kind and the gas-permeable bottom plate is arranged loosely on top of structural elements provided inside the ammonia oxidation burner.

However, the loose arrangement of the gas-permeable bottom plate on top of the internal components provided inside the reactor produces a circumferential gap between the circumferential wall of the burner basket, which is of cylindrical design according to prior art, and the gas-permeable bottom plate. This happens as soon as the cylindrical wall of the burner basket and the gas-permeable bottom plate start expanding to varying extents. The inevitable consequential subsiding of the carrier material will subsequently cause a slip of gas so that downstream cooling in the waste heat boiler cannot be effective immediately and the NO produced will very probably undergo decomposition.

In addition, there is the risk that the carrier material for the catalyst gauzes falls through this gap and the carrier material hence does no longer perform its task of supporting the catalyst gauzes in a uniform way. The packing structure of the carrier material is thus destroyed and the packing will show cracks and grooves. It is known that phenomena of such kind go along with a loss of combustion efficiency and ammonia slip. It is imperative to avoid ammonia slip for environmental reasons, and a reduced combustion efficiency affects the efficiency of the overall process so that eventually less nitric acid will be produced.

The following is to describe several attempts of optimising existing ammonia oxidation burners.

DE 102008059930 A1 describes a reactor for catalytic, exothermic gas phase reactions including at least one catalyst which is to substitute Pt/Rh gauzes. FIG. 8 of this document shows a high-temperature resistant support for the catalyst into which the catalyst is inserted. To use a supporting structure of such kind for a gas-permeable bottom plate above the combustion level is not possible from the constructional point of view if platinum gauzes are used. In addition it is not practicable from the process point of view as by the pre-ignition of the ammonia air mixture undesired by-products would be obtained on the hot metal supporting structures, which would lower the efficiency of the NO production.

WO 00/40329 A shows a catalyst supporting structure with a burner basket wall tapered conically towards the bottom plate which is firmly fixed to this wall. An adequately dimensioned supporting structure of such kind would inevitably increase the pressure loss and would not be suited for the application according to the invention.

It is therefore required to continue optimisation of the existing burner baskets in order to avoid the before-mentioned problems in ammonia oxidation burners.

The aim of the present invention is therefore to provide an ammonia oxidation burner with a burner basket system, in which the wall of the burner basket is not connected mechanically to the gas-permeable bottom plate, and which reduces a slip of gas and also minimizes a loss of media, such as Raschig rings, contained in the burner basket. Another aim is to prevent surface corrugation of the material contained in the burner basket. A further aim of the invention is to provide a method that suits the purpose.

The aim of the invention is achieved by a system of a burner basket for an ammonia oxidation burner for commercial-scale plants with burner diameters of 2-7 m in a natural or forced circulation boiler, the system being suited to minimize gas slip and to minimize surface corrugation of media contained in the burner basket as well as to minimize loss of media contained in the burner basket, with the burner basket being provided with a wall (1) which is fixed to the ammonia oxidation burner, and provided with a gas-permeable bottom plate (2) arranged on top of further internal components of the natural or forced circulation boiler, the wall (1) and the gas-permeable bottom plate (2) not being connected mechanically and the wall (1) of the burner basket being tapered conically towards the bottom plate at an angle of 5-20° to the perpendicular and a gap in the range of 5 to 10 mm being produced between the wall (1) and the gas-permeable bottom plate (2) under all operating conditions of the ammonia oxidation burner.

This burner basket system is to achieve a small circumferential gap between the gas-permeable bottom and the burner basket wall under all operating conditions so to prevent carrier material or catalyst from slipping through. Surface corrugation of the carrier material is minimized as a result of the conical design of the burner basket wall. When the reactor is cooled, the carrier material and/or the catalyst material is pressed upwards into the initial position more easily thanks to the conical design of the burner basket wall. The forces that act upon the internal components owing to the restricted thermal expansion are reduced by the conical design of the wall to such an extent that damage of the burner basket system is reduced to a reasonable degree.

Fixing of the wall of the burner basket in the ammonia oxidation burner may be implemented such that the burner basket is suspended in appropriate devices in the ammonia oxidation burner or, for example, by fixing the wall of the burner basket to the ammonia oxidation burner via a flanged connection. Furthermore, the wall of the burner basket may also be welded to the ammonia oxidation burner.

The additional internal components may be, as described above, the tube coils of the waste heat boiler. It is, however, possible to use any type of additional internal components, such as further supporting structures, for carrying the gas-permeable bottom plate. In such case, the bottom plate is not connected mechanically to the other internal components but rests on them loosely.

As a result of the conical shape of the burner basket wall (1) the gap forming between the gas-permeable bottom plate and the wall can, with given diameter of a gas-permeable bottom plate, be minimized from the very beginning and an adequate sealing effect against the slip-through of carrier material or catalyst can be achieved. In addition, further measures can be taken by providing internal components in the burner basket as shown below in order to optimise the sealing effect further. In comparison to conventional burner baskets with cylindrical wall, however, the sealing effect achieved without further internal components is remarkable already.

Advantageously there is an additional gas-permeable structure (3) on top of the gas-permeable bottom plate (2). In such case, the additional gas-permeable structure (3) extends preferably over the gap between wall (1) and gas-permeable bottom plate (2). In a preferred embodiment the additional gas-permeable structure (3) is of a smaller mesh size than the gas-permeable bottom plate (2). The additional gas-permeable structure may be a meshed fabric, for example.

The gas-permeable bottom plate is preferably a honeycomb-structured grid, a meshed plate, a sieve plate, a grid plate or a perforated plate. Especially preferred is the use of a honeycomb-structured grid as experience shows that this type of bottom plate design meets the requirements of an ammonia oxidation burner best.

The present invention further includes a method for minimising gas slip and for minimising the surface corrugation of media contained in the burner basket as well as for minimising loss of media contained in the burner basket of an ammonia oxidation burner for commercial-scale plants with burner diameters of 2-7 m in a natural or forced circulation boiler, with the burner basket being provided with a wall (1) which is fixed to the ammonia oxidation burner, and with the burner basket being provided with a gas-permeable bottom plate (2) arranged on top of additional internal components of the natural or forced circulation boiler, with the wall (1) and the gas-permeable bottom plate (2) not being connected mechanically and a circumferential gap (4) being produced between gas-permeable bottom plate (2) and wall (1) and with the wall (1) of the burner basket being tapered conically towards the bottom plate at an angle of 5-20° to the perpendicular, the width of the gap enlarging to a maximum of 10 mm upon expansion during operation of the ammonia oxidation burner.

According to an embodiment of the method according to the invention an additional gas-permeable fabric (3) is arranged on top of the gas-permeable bottom plate (2) to improve the sealing effect, the fabric extending over the gap and being of a smaller mesh size than the gas-permeable bottom plate (2).

The present invention is explained in more detail by means of FIG. 1*a* to FIG. 1*c*.

FIG. 1*a* Schematic drawing of a conventional burner basket according to prior art.

FIG. 1*b* Schematic drawing of a burner basket according to the invention with conical burner basket wall.

FIG. 1*c* Schematic drawing of a burner basket according to the invention with conical burner basket wall and additional gas-permeable structure.

FIG. 1*a* gives a schematic of a burner basket according to prior art. Between gas-permeable plate 2 and wall 1 a gap 4 is produced through which slip of gas may occur. Secondly there is the problem that carrier material (not shown) as, for example, Raschig rings, carried by gas-permeable bottom plate 2 may fall through this gap 4 and thus destroy the packing structure of the carrier material and cause the formation of cracks and grooves. This is to be avoided to achieve an efficient reaction in the ammonia oxidation burner.

The size of gap 4 is now reduced by designing wall 1 conically according to the invention instead of cylindrically as shown in FIG. 1*a*. As shown in FIG. 1*b*, wall 1 of the burner basket is tapered towards the bottom plate at an angle of 5 to 20° to the perpendicular. The design according to the invention provides for a gap between wall 1 and gas-permeable bottom plate 2 in a range between 5 and 10 mm. This measure alone makes it possible to improve the sealing effect drastically as compared to a cylindrical form of wall 1 of the burner basket.

FIG. 1*c* shows how the burner basket system according to the invention is further improved by arranging an additional gas-permeable structure on top of bottom plate 2. This gas-permeable structure, which in most cases is designed in the form of a wire mesh, extends in an exemplary mode over gap 4 and is advantageously of a smaller mesh size than gas-permeable bottom plate 2. This allows achieving an improved sealing effect for material (not shown) that may be contained in the burner basket.

In all figures shown, gas-permeable bottom plate 2 is arranged loosely on top of internal components, such as tube coils, of the waste heat boiler. These internal components may also be used for bearing further supporting structures which carry gas-permeable bottom plate 2.

Advantages created by the invention are:
- with regard to commercial-scale applications, cost-efficient minimization of bypass in the form of gas slip of NO product gases, which can thus be submitted to cooling directly via the gas-permeable bottom plate, a decomposition of the NO being prevented almost completely.
- minimization of bypass of catalyst-gauze carrier materials resting on the gas-permeable bottom plate. In this way retention of the packing structure of the carrier materials is ensured and thus a formation of cracks and grooves which may also allow slip of gas, e.g. ammonia, prevented.
- in comparison to the cylindrical design, minimization of forces acting upon the basket components by the restricted thermal expansion during start-up and shut-down operations as a result of the conical shape of the basket.

LIST OF REFERENCE NUMBERS AND DESIGNATIONS

1 Wall
2 Gas-permeable bottom plate
3 Gas-permeable structure
4 Gap

The invention claimed is:

1. A system of a burner basket for ammonia oxidation burners for commercial-scale plants with burner diameters of 2-7 m in a natural or forced circulation boiler, the system being suited to minimize gas slip and to minimize surface corrugation of media contained in the burner basket as well as to minimize loss of media contained in the burner basket,
with the burner basket being provided with a wall which is fixed to the ammonia oxidation burner, and the burner basket being provided with a gas-permeable bottom plate arranged on top of internal components of the natural or forced circulation boiler, the wall and the gas-permeable bottom plate not being connected mechanically, and the wall of the burner basket being tapered conically towards the bottom plate at an angle of 5-20° relative to vertical and a circumferential gap in the range of 5 to 10 mm being produced between the wall and the gas-permeable bottom plate under all operating conditions of the ammonia oxidation burner.

2. The system of a burner basket for ammonia oxidation burners for commercial-scale plants with burner diameters of 2-7 m in a natural or forced circulation boiler according to claim 1, wherein there is an additional gas-permeable structure on top of the gas-permeable bottom plate.

3. The system of a burner basket for ammonia oxidation burners for commercial-scale plants with burner diameters of 2-7 m in a natural or forced circulation boiler according to claim 2, wherein the additional gas-permeable structure extends over the gap between the wall and the gas-permeable bottom plate.

4. The system of a burner basket for The system of a burner basket for ammonia oxidation burners for commercial-scale plants with burner diameters of 2-7 m in a natural or forced circulation boiler according to claim 2, wherein the additional gas-permeable structure is of a smaller mesh size than the gas-permeable bottom plate.

5. The system of a burner basket for ammonia oxidation burners for commercial-scale plants with burner diameters of 2-7 m in a natural or forced circulation boiler according to claim 1, wherein the gas-permeable bottom plate is a honeycomb-structured grid, a mesh plate, a sieve plate, a grid plate or a perforated plate.

6. A method for minimizing gas slip and for minimizing surface corrugation of media contained in the burner basket as well as for minimizing the loss of media contained in the burner basket of an ammonia oxidation burner for commercial-scale plants with burner diameters of 2-7 m, comprising the step of:
providing a natural or forced circulation boiler,
wherein the burner basket is provided with a wall which is fixed to the ammonia oxidation burner, and the burner basket is provided with a gas-permeable bottom plate arranged on top of internal components of the natural or forced circulation boiler, the wall and the gas-permeable bottom plate not being connected mechanically and a circumferential gap being produced between gas-permeable bottom plate and wall, and
wherein the wall of the burner basket is tapered conically towards the bottom plate at an angle of 5-20° relative to vertical, with the width of the gap enlarging to a maximum of 10 mm during operation of the ammonia oxidation burner.

7. The method according to claim 6, wherein an additional gas-permeable fabric is arranged on top of the gas-permeable bottom plate to improve the sealing effect, the fabric extending over the gap and being of a smaller mesh size than the gas-permeable bottom plate.

* * * * *